United States Patent
Brittingham

(10) Patent No.: US 11,060,407 B2
(45) Date of Patent: Jul. 13, 2021

(54) TURBOMACHINE ROTOR BLADE

(71) Applicant: General Electric Company, Schenectady, NY (US)

(72) Inventor: Robert Alan Brittingham, Greer, SC (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 251 days.

(21) Appl. No.: 15/630,067

(22) Filed: Jun. 22, 2017

(65) Prior Publication Data
US 2018/0371921 A1 Dec. 27, 2018

(51) Int. Cl.
| | |
|---|---|
| *F01D 5/18* | (2006.01) |
| *F01D 5/22* | (2006.01) |
| *F01D 5/14* | (2006.01) |
| *F01D 5/06* | (2006.01) |
| *F01D 11/00* | (2006.01) |

(52) U.S. Cl.
CPC .............. *F01D 5/18* (2013.01); *F01D 5/147* (2013.01); *F01D 5/225* (2013.01); *F01D 5/06* (2013.01); *F01D 11/006* (2013.01); *F05D 2220/32* (2013.01); *F05D 2240/307* (2013.01); *F05D 2240/81* (2013.01); *F05D 2260/201* (2013.01)

(58) Field of Classification Search
CPC ............. F01D 5/147; F01D 5/18; F01D 5/225
See application file for complete search history.

(56) References Cited

U.S. PATENT DOCUMENTS

| | | | |
|---|---|---|---|
| 3,876,330 A | 4/1975 | Pearson et al. | |
| 4,127,358 A | 11/1978 | Parkes | |
| 4,948,338 A * | 8/1990 | Wickerson | F01D 5/187 416/92 |
| 6,099,253 A * | 8/2000 | Fukue | F01D 5/187 416/97 R |
| 6,146,098 A * | 11/2000 | Fukuno | F01D 5/18 416/191 |

(Continued)

FOREIGN PATENT DOCUMENTS

| | | |
|---|---|---|
| DE | 11 2016 001691 T5 | 12/2017 |
| EP | 1 041 247 A2 | 10/2000 |

(Continued)

OTHER PUBLICATIONS

Extended European Search Report and Opinion issued in connection with corresponding EP Application No. 18178422.4 dated Nov. 29, 2018.

(Continued)

*Primary Examiner* — Sizo B Vilakazi
*Assistant Examiner* — Anthony L Bacon
(74) *Attorney, Agent, or Firm* — Dority & Manning, P.A.

(57) ABSTRACT

The present disclosure is directed to a rotor blade for a turbomachine. The rotor blade includes an airfoil and a tip shroud coupled to the airfoil. The tip shroud includes a side surface. The airfoil and the tip shroud define a first cooling passage. The tip shroud further defines a second passage in fluid communication with the first cooling passage. The second cooling passage extends from the first cooling passage to a first outlet defined by the side surface. The first outlet is configured to direct a flow of coolant onto a tip shroud fillet of a first adjacent rotor blade.

17 Claims, 6 Drawing Sheets

(56) References Cited

U.S. PATENT DOCUMENTS

| | | | |
|---|---|---|---|
| 6,152,694 A * | 11/2000 | Ai | F01D 5/187 416/191 |
| 6,152,695 A * | 11/2000 | Fukue | F01D 5/187 415/115 |
| 6,254,345 B1 * | 7/2001 | Harris | F01D 5/18 416/189 |
| 6,811,378 B2 * | 11/2004 | Kraft | F01D 5/18 416/191 |
| 7,273,347 B2 | 9/2007 | Rathmann | |
| 7,686,581 B2 | 3/2010 | Brittingham et al. | |
| 7,946,816 B2 | 5/2011 | Brittingham | |
| 8,096,767 B1 * | 1/2012 | Liang | F01D 5/225 416/97 R |
| 9,127,560 B2 | 9/2015 | Collier et al. | |
| 2007/0031240 A1 * | 2/2007 | Nichols | F01D 11/08 415/115 |
| 2008/0170946 A1 * | 7/2008 | Brittingham | F01D 5/225 416/97 R |
| 2009/0123268 A1 * | 5/2009 | Brittingham | F01D 5/141 415/115 |
| 2009/0180895 A1 | 7/2009 | Brittingham | |
| 2011/0286849 A1 * | 11/2011 | Tsypkaykin | F01D 5/225 416/223 R |
| 2012/0070309 A1 | 3/2012 | Zambetti et al. | |
| 2012/0177479 A1 * | 7/2012 | Azad | F01D 9/041 415/115 |
| 2013/0142649 A1 * | 6/2013 | Collier | F01D 5/187 416/1 |
| 2013/0142667 A1 * | 6/2013 | Ito | F01D 25/12 416/97 R |
| 2016/0169037 A1 * | 6/2016 | Lefebvre | F01D 11/005 415/1 |
| 2017/0114645 A1 | 4/2017 | Chouhan et al. | |
| 2017/0114647 A1 | 4/2017 | Chouhan et al. | |
| 2017/0114648 A1 | 4/2017 | Chouhan et al. | |
| 2017/0138203 A1 | 5/2017 | Jaiswal et al. | |
| 2017/0145830 A1 * | 5/2017 | Jacala | F01D 5/18 |
| 2018/0142567 A1 * | 5/2018 | Klingels | F01D 5/225 |

FOREIGN PATENT DOCUMENTS

| | | |
|---|---|---|
| EP | 1 083 299 A2 | 3/2001 |
| EP | 2 599 958 A2 | 6/2013 |
| EP | 2607629 A1 | 6/2013 |
| FR | 2275975 A5 | 1/1976 |
| JP | 5868609 B2 | 2/2016 |

OTHER PUBLICATIONS

U.S. Appl. No. 14/974,155, filed Dec. 18, 2015.
U.S. Appl. No. 14/974,193, filed Dec. 18, 2015.
U.S. Appl. No. 15/615,876, filed Jun. 7, 2017.

* cited by examiner

TURBOMACHINE ROTOR BLADE

FIELD

The present disclosure generally relates to turbomachines. More particularly, the present disclosure relates rotor blades for turbomachines.

BACKGROUND

A gas turbine engine generally includes a compressor section, a combustion section, and a turbine section. The compressor section progressively increases the pressure of air entering the gas turbine engine and supplies this compressed air to the combustion section. The compressed air and a fuel (e.g., natural gas) mix within the combustion section and burn within one or more combustion chambers to generate high pressure and high temperature combustion gases. The combustion gases flow from the combustion section into the turbine section where they expand to produce work. For example, expansion of the combustion gases in the turbine section may rotate a rotor shaft connected to a generator to produce electricity.

The turbine section generally includes a plurality of rotor blades. Each rotor blade includes an airfoil positioned within the flow of the combustion gases. In this respect, the rotor blades extract kinetic energy and/or thermal energy from the combustion gases flowing through the turbine section. Some rotor blades may include a tip shroud coupled to the radially outer end of the airfoil. The tip shroud reduces the amount of combustion gases leaking past the rotor blade.

The rotor blades generally operate in extremely high temperature environments. As such, the tip shroud of each rotor blade may define various cooling passages through which a coolant may flow. Nevertheless, the cooling passages may only provide limited cooling to certain portions of the tip shroud, such as various fillets. This may limit the operating temperature of the rotor blade and/or the service life of the rotor blade.

BRIEF DESCRIPTION

Aspects and advantages of the technology will be set forth in part in the following description, or may be obvious from the description, or may be learned through practice of the technology.

In one aspect, the present disclosure is directed to a rotor blade for a turbomachine. The rotor blade includes an airfoil and a tip shroud coupled to the airfoil. The tip shroud includes a side surface. The airfoil and the tip shroud define a first cooling passage. The tip shroud further defines a second passage in fluid communication with the first cooling passage. The second cooling passage extends from the first cooling passage to a first outlet defined by the side surface. The first outlet is configured to direct a flow of coolant onto a tip shroud fillet of a first adjacent rotor blade.

In another aspect, the present disclosure is directed to a turbomachine including a turbine section having a plurality of rotor blades. A first rotor blade of the plurality of rotor blades includes an airfoil and a tip shroud coupled to the airfoil. The tip shroud includes a side surface. The airfoil and the tip shroud define a first cooling passage. The tip shroud further defines a second passage in fluid communication with the first cooling passage. The second cooling passage extends from the first cooling passage to a first outlet defined by the side surface. The first outlet is configured to direct a flow of coolant onto a tip shroud fillet of a second rotor blade of the plurality of rotor blades.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
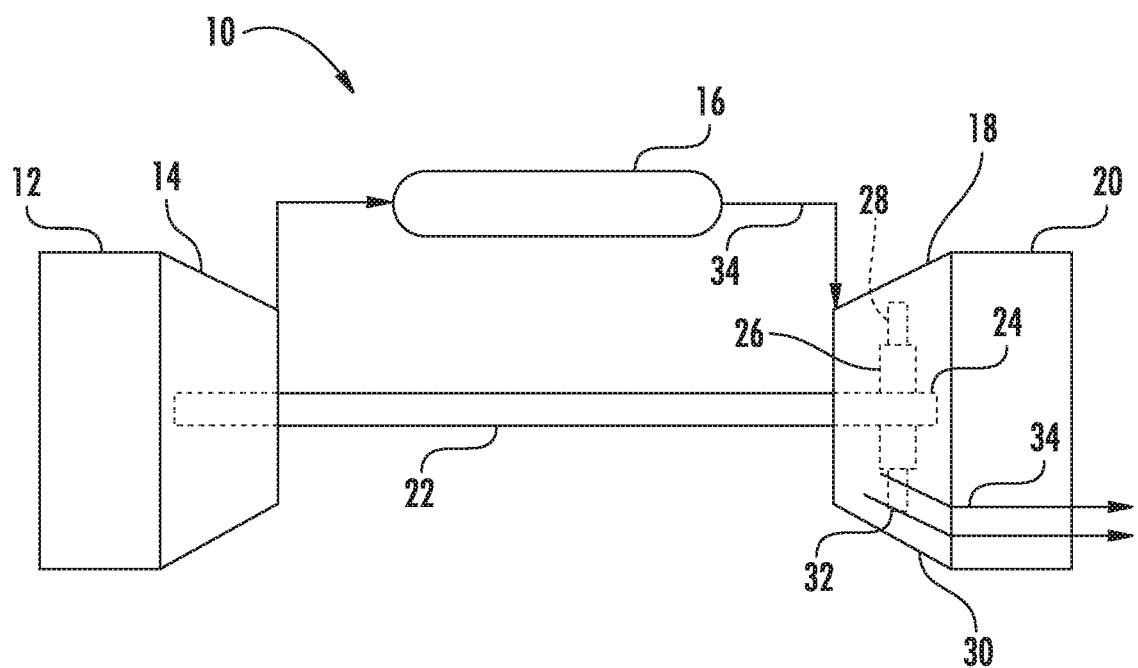
FIG. 1 is a schematic view of an exemplary gas turbine engine in accordance with the embodiments disclosed herein.

Repeat use of reference characters in the present specification and drawings is intended to represent the same or analogous features or elements of the present technology.

DETAILED DESCRIPTION

Reference will now be made in detail to present embodiments of the technology, one or more examples of which are illustrated in the accompanying drawings. The detailed description uses numerical and letter designations to refer to features in the drawings. Like or similar designations in the drawings and description have been used to refer to like or similar parts of the technology. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows.

Each example is provided by way of explanation of the technology, not limitation of the technology. In fact, it will be apparent to those skilled in the art that modifications and variations can be made in the present technology without departing from the scope or spirit thereof. For instance, features illustrated or described as part of one embodiment may be used on another embodiment to yield a still further embodiment. Thus, it is intended that the present technology covers such modifications and variations as come within the scope of the appended claims and their equivalents.

Although an industrial or land-based gas turbine is shown and described herein, the present technology as shown and described herein is not limited to a land-based and/or industrial gas turbine unless otherwise specified in the claims. For example, the technology as described herein may be used in any type of turbomachine including, but not limited to, aviation gas turbines (e.g., turbofans, etc.), steam turbines, and marine gas turbines.

Referring now to the drawings, wherein identical numerals indicate the same elements throughout the figures, FIG. 1 schematically illustrates a gas turbine engine 10. As shown, the gas turbine engine 10 may include an inlet section 12, a compressor section 14, a combustion section 16, a turbine section 18, and an exhaust section 20. The compressor section 14 and turbine section 18 may be coupled by a shaft 22. The shaft 22 may be a single shaft or a plurality of shaft segments coupled together to form the shaft 22.

The turbine section 18 may include a rotor shaft 24 having a plurality of rotor disks 26 (one of which is shown) and a plurality of rotor blades 28. Each rotor blade 28 extends radially outward from and interconnects to one of the rotor disks 26. Each rotor disk 26, in turn, may be coupled to a portion of the rotor shaft 24 that extends through the turbine section 18. The turbine section 18 further includes an outer casing 30 that circumferentially surrounds the rotor shaft 24 and the rotor blades 28, thereby at least partially defining a hot gas path 32 through the turbine section 18.

During operation, the gas turbine engine 10 produces mechanical rotational energy, which may, e.g., be used to generate electricity. More specifically, air enters the inlet section 12 of the gas turbine engine 10. From the inlet section 12, the air flows into the compressor 14, where it is progressively compressed to provide compressed air to the combustion section 16. The compressed air in the combustion section 16 mixes with a fuel to form an air-fuel mixture, which combusts to produce high temperature and high pressure combustion gases 34. The combustion gases 34 then flow through the turbine 18, which extracts kinetic and/or thermal energy from the combustion gases 34. This energy extraction rotates the rotor shaft 24, thereby creating mechanical rotational energy for powering the compressor section 14 and/or generating electricity. The combustion gases 34 exit the gas turbine engine 10 through the exhaust section 20.

Figure 2:
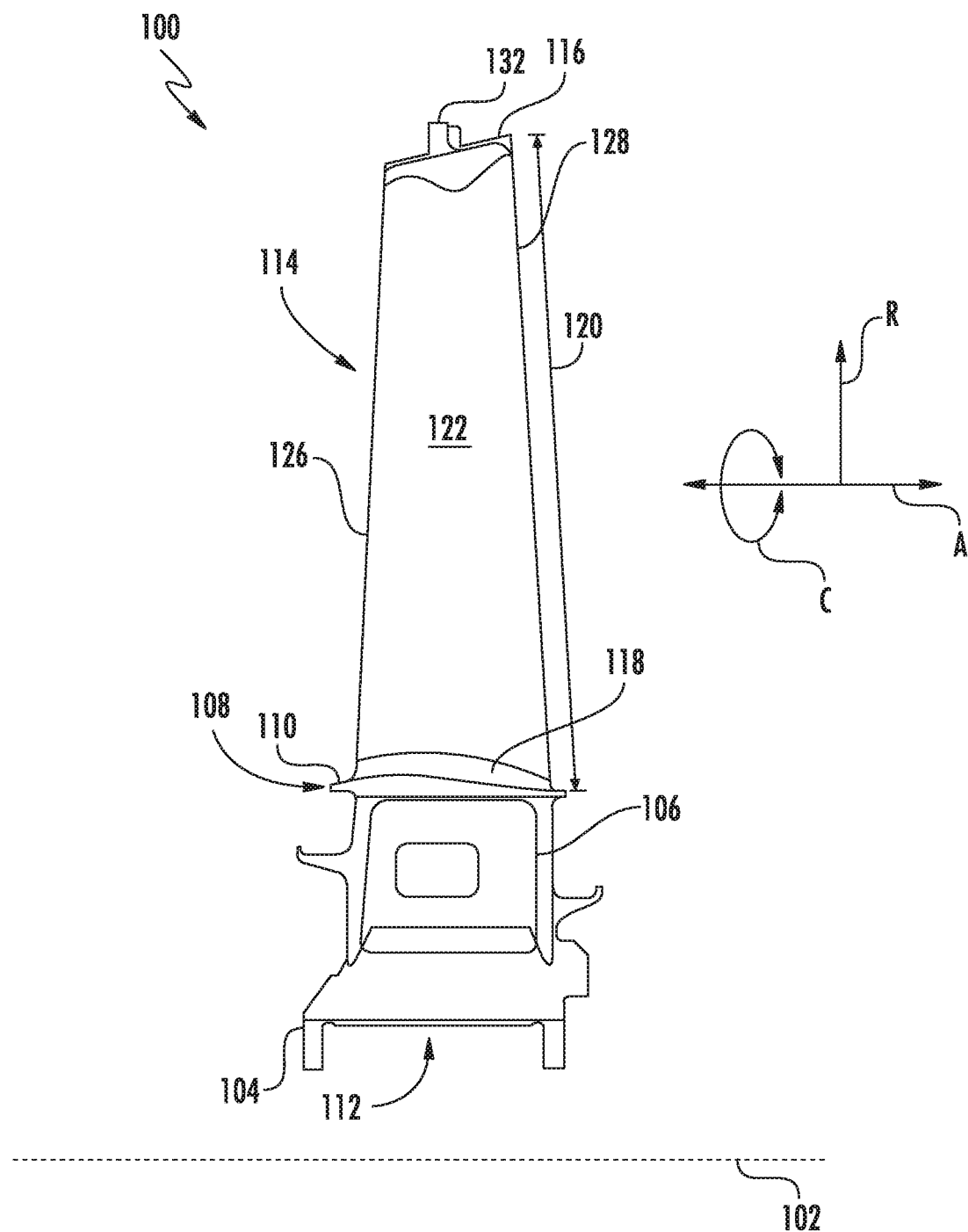
FIG. 2 is a side view of an exemplary rotor blade in accordance with the embodiments disclosed herein.

FIG. 2 is a side view of an exemplary rotor blade 100, which may be incorporated into the turbine section 18 of the gas turbine engine 10 in place of the rotor blade 28. As shown, the rotor blade 100 defines an axial direction A, a radial direction R, and a circumferential direction C. In general, the axial direction A extends parallel to an axial centerline 102 of the shaft 24 (FIG. 1), the radial direction R extends generally orthogonal to the axial centerline 102, and the circumferential direction C extends generally concentrically around the axial centerline 102. The rotor blade 100 may also be incorporated into the compressor section 14 of the gas turbine engine 10 (FIG. 1).

As illustrated in FIG. 2, the rotor blade 100 may include a dovetail 104, a shank portion 106, and a platform 108. More specifically, the dovetail 104 secures the rotor blade 100 to the rotor disk 26 (FIG. 1). The shank portion 106 couples to and extends radially outward from the dovetail 104. The platform 108 couples to and extends radially outward from the shank portion 106. The platform 108 includes a radially outer surface 110, which generally serves as a radially inward flow boundary for the combustion gases 34 flowing through the hot gas path 32 of the turbine section 18 (FIG. 1). The dovetail 104, the shank portion 106, and platform 108 may define an intake port 112, which permits a coolant (e.g., bleed air from the compressor section 14) to enter the rotor blade 100. In the embodiment shown in FIG. 2, the dovetail 104 is an axial entry fir tree-type dovetail. Alternately, the dovetail 104 may be any suitable type of dovetail. In fact, the dovetail 104, shank portion 106, and/or platform 108 may have any suitable configurations.

Figure 3:
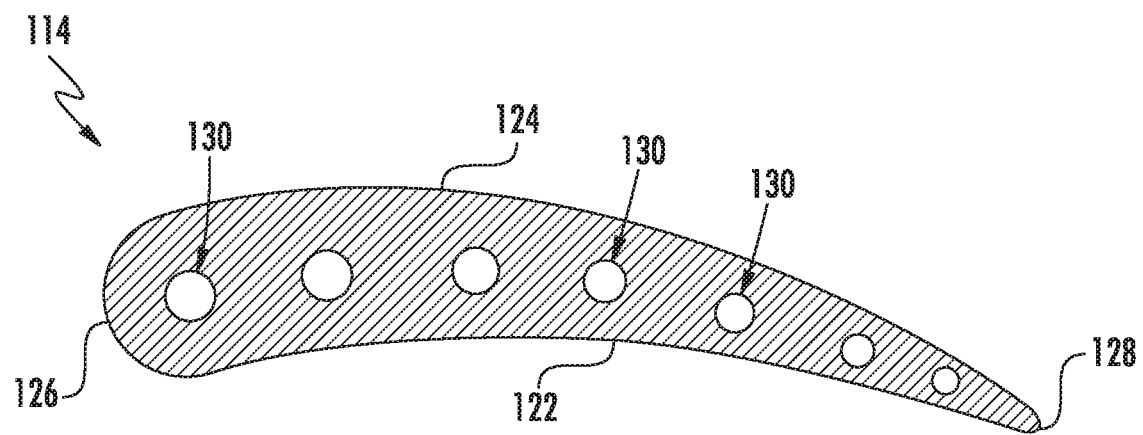
FIG. 3 is cross-sectional view of an exemplary airfoil in accordance with the embodiments disclosed herein.

Referring now to FIGS. 2 and 3, the rotor blade 100 further includes an airfoil 114. In particular, the airfoil 114 extends radially outward from the radially outer surface 110 of the platform 108 to a tip shroud 116. The airfoil 114 couples to the platform 108 at a root 118 (i.e., the intersection between the airfoil 114 and the platform 116). In this respect, the airfoil 118 defines an airfoil span 120 extending between the root 118 and the tip shroud 116. The airfoil 114 also includes a pressure side surface 122 and an opposing suction side surface 124 (FIG. 3). The pressure side surface 122 and the suction side surface 124 are joined together or interconnected at a leading edge 126 of the airfoil 114 and a trailing edge 128 of the airfoil 114. As shown, the leading edge 126 is oriented into the flow of combustion gases 34 (FIG. 1), while the trailing edge 128 is spaced apart from and positioned downstream of the leading edge 126. The pressure side surface 122 and the suction side surface 124 are continuous about the leading edge 126 and the trailing edge 128. Furthermore, the pressure side surface 122 is generally concave, and the suction side surface 124 is generally convex.

As shown in FIG. 3, the rotor blade 100, and, more particularly, the airfoil 114 and the tip shroud 116, may define one or more radially-extending cooling passages 130 extending therethrough. More specifically, the radially-extending cooling passages 130 may extend from the intake port 112 through the airfoil 114 to the tip shroud 116. In this respect, coolant may flow through the radially-extending cooling passages 130 from the intake port 112 to the tip shroud 116. In the embodiment shown in FIG. 3, for example, the airfoil 114 defines seven radially-extending cooling passages 130. In alternate embodiments, however, the airfoil 114 may define more or fewer radially-extending cooling passages 130.

Figure 4:
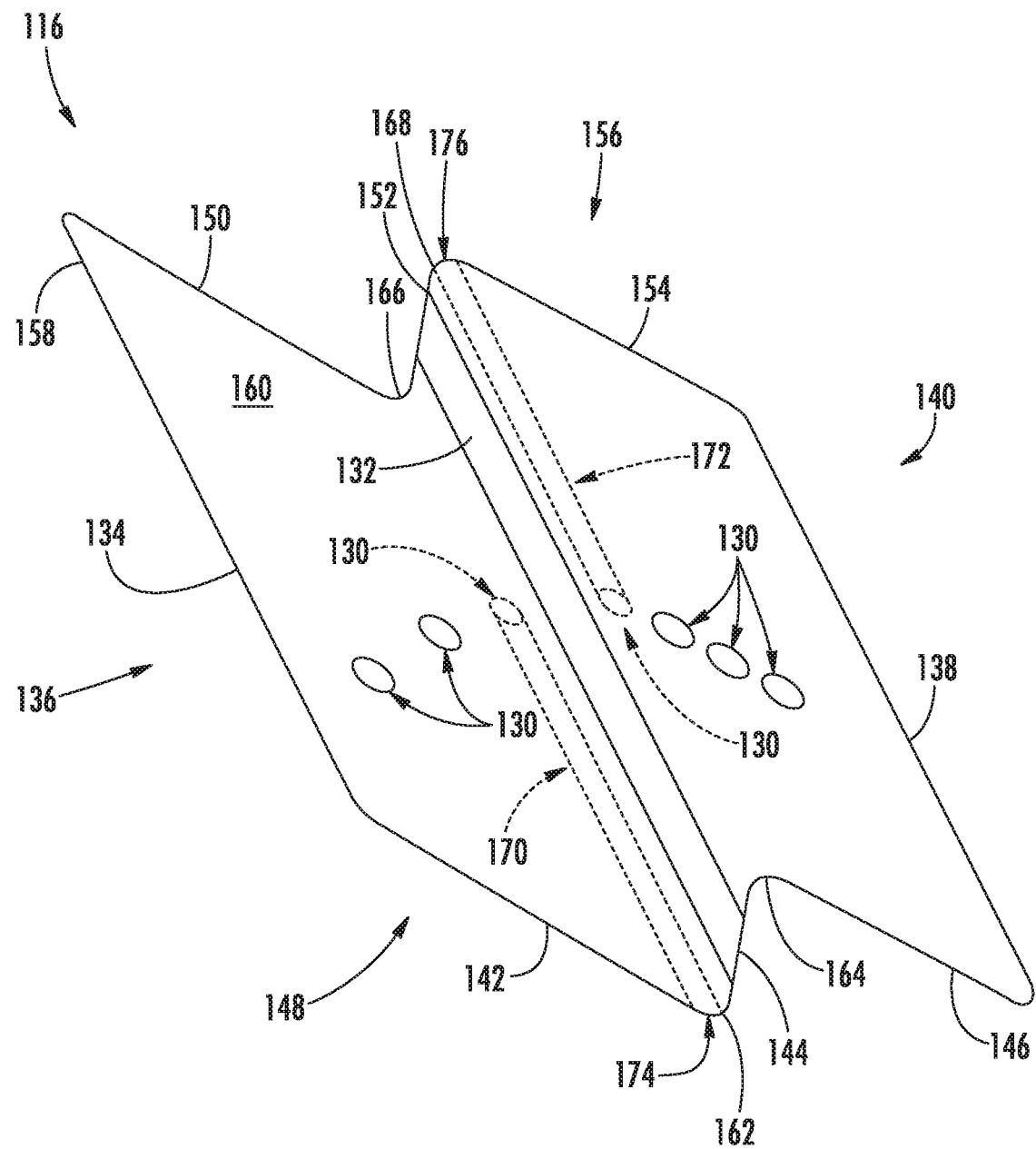
FIG. 4 is a top view of a tip shroud in accordance with the embodiments disclosed herein.

As mentioned above, the rotor blade 100 includes the tip shroud 116. As illustrated in FIGS. 2 and 4, the tip shroud 116 couples to the radially outer end of the airfoil 114 and generally defines the radially outermost portion of the rotor blade 100. In this respect, the tip shroud 116 reduces the amount of the combustion gases 34 (FIG. 1) that escape past the rotor blade 100. As shown, the tip shroud 116 may include a seal rail 132. Alternate embodiments, however, may include more seal rails 132 (e.g., two seal rails 132, three seal rails 132, etc.) or no seal rails 132.

Referring now to FIG. 4, the tip shroud 116 includes various surfaces. For example, the tip shroud 116 may include a forward side surface 134 positioned at a forward end 136 of the tip shroud 116 and an aft side surface 138 positioned at an aft end 140 of the tip shroud 116. The tip shroud 116 may also include a first pressure side surface 142, a second pressure side surface 144, and a third pressure side surface 146 positioned on a pressure side 148 of the tip shroud 116. Similarly, the tip shroud 116 may also include a first suction side surface 150, a second suction side surface 152, and a third suction side surface 154 positioned on a suction side 156 of the tip shroud 116. The surfaces 134, 138, 142, 144, 146, 150, 152, 154 may be collectively referred to as a side surface 158. Furthermore, the tip shroud 114 also includes a radially outer surface 160 from which the seal rail 132 may extend outward. As shown, in some embodiments, the seal rail 152 may extend between the second pressure side surface 144 and the second suction side surface 152. In alternate embodiments, however, the tip shroud 116 may have any suitable combination and/or configuration of surfaces.

In the embodiment shown in FIG. 4, the tip shroud 116 has a Z-notch configuration. More specifically, the first, second, and third pressure side walls 142, 144, 146 define a Z-shape. In this respect, a pressure side convex fillet 162 transitions between the first and second pressure side walls 142, 144, while a pressure side concave fillet 164 transitions between the second and third pressure side walls 144, 146. The first, second, and third suction side walls 150, 152, 154 define a Z-shape that is complementary to the Z-shape of the pressure side walls 142, 144, 146. As such, a suction side concave fillet 166 transitions between the first and second suction side walls 150, 152, while a suction side convex fillet 168 transitions between the second and third suction side walls 152, 154. In alternate embodiments, however, the tip shroud 116 may have any suitable shape and/or configuration.

The tip shroud 116 may define pressure side and suction side cooling passages 170, 172. As shown, the cooling passages 170, 172 respectively extend from different radially-extending cooling passages 130 to pressure side and suction side outlets 174, 176 defined by the side surface 158. For example, the pressure side cooling passage 170 is fluidly coupled to one of the radially-extending cooling passages 130, such as one of the cooling passages 130 positioned forward of the seal rail 132. As such, the pressure side cooling passage 170 extends through the tip shroud 116 to the pressure side outlet 174. As shown, the cooling passage 170 may be positioned forward of the seal rail 132 in some embodiments. Similarly, the suction side cooling passage 172 is fluidly coupled to another of the radially-extending cooling passages 130, such as one of the cooling passages 130 positioned aft of the seal rail 132. In this respect, the suction side cooling passage 172 extends through the tip shroud 116 to the suction side outlet 176. As shown, the cooling passage 170 may be positioned aft of the seal rail 132 in some embodiments. In alternate embodiments, the pressure side cooling passage 170 and outlet 174 may positioned aft of the seal rail 132 and the suction side cooling passage 172 and outlet 176 may be positioned forward of the seal rail 132. The pressure side and suction side cooling passages 170, 172 extend toward the side surface 158 in opposite directions and may generally be parallel or substantially parallel to each other as shown in FIG. 4. In certain embodiments, the cooling passages 170, 172 may extend along the seal rail 132, such as parallel or substantially parallel to the seal rail 132. Although, in other embodiments, the positioning of the cooling passage 170, 172 may be independent of the seal rail 132. The tip shroud 116 may entirely define the cooling passages 170, 172. Alternatively, the cooling passages 170, 172 may extend through the tip shroud 116 in any suitable manner. In further embodiments, the tip shroud 116 may define only one of the pressure side or suction side cooling passages 170, 172.

As mentioned above, the pressure side and suction side cooling passages 170, 172 respectively have pressure side and suction side outlets 174, 176 defined by the side surface 158. In the embodiment shown in FIG. 4, the pressure side convex fillet 162 defines the pressure side outlet 174 and the suction side convex fillet 168 defines the suction side outlet 176. In this respect, and as will be described in greater detail below, the outlets 174, 176 are configured to direct a flow of coolant onto the concave fillets 164, 166 of the adjacent rotor blades. In some embodiments, the outlets 174, 176 may be configured to expel the coolant at a sufficient velocity to traverse a gap 182 (FIG. 6) between the outlet 174, 176 and the corresponding concave fillet 164, 166 of the adjacent rotor blade such that the coolant impinges on the corresponding concave fillet 164, 166 of the adjacent rotor blade. In this respect, the outlets 174, 176 may have the same diameter as the corresponding cooling passage 170, 172 in some embodiments. In alternate embodiments, however, any suitable portion of the side surface 158 may define the outlets 174, 176 so long as the outlets 174, 176 may be configured to direct the flow of coolant onto suitable tip shroud fillets of the adjacent rotor blades.

Figure 5:
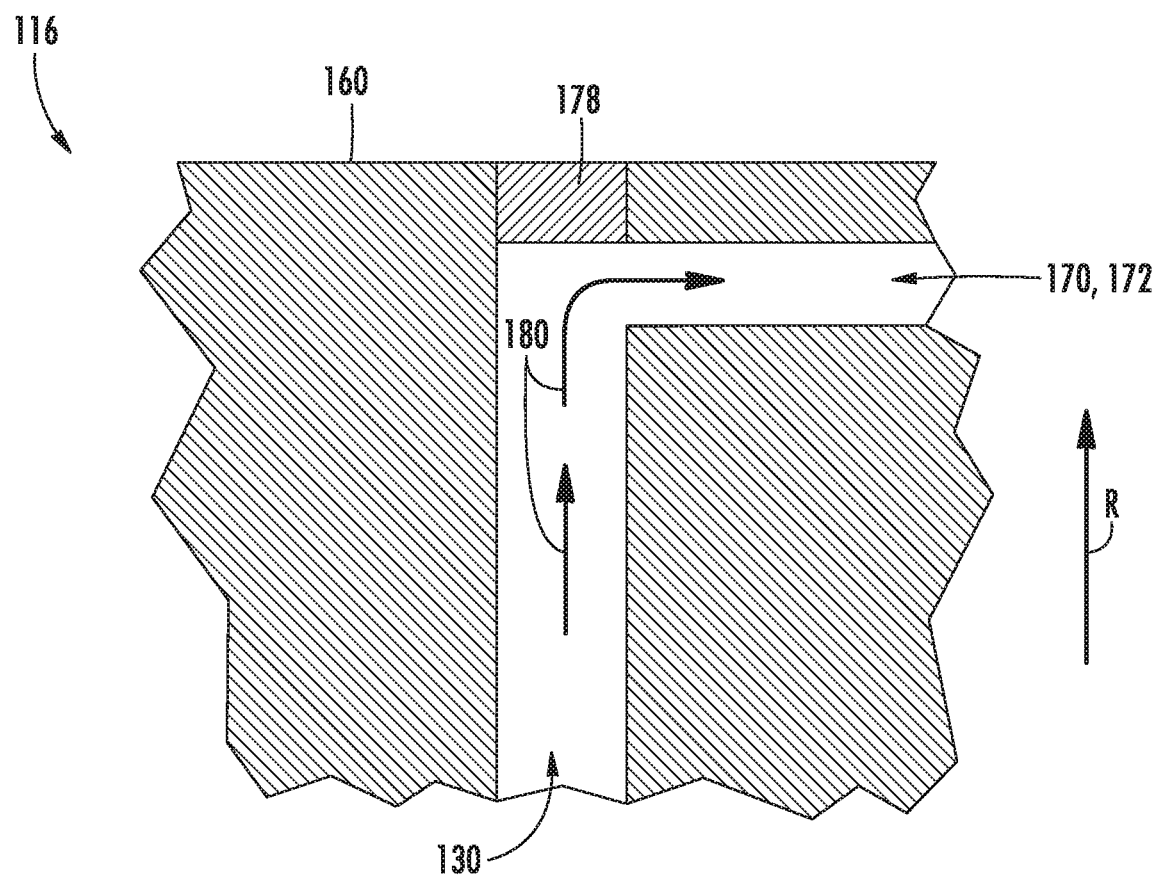
FIG. 5 is a cross-sectional view of a portion of the tip shroud shown in FIG. 4, illustrating a plug in accordance with the embodiments disclosed herein.

Referring now to FIG. 5, the tip shroud 116 may include a plug 178 positioned within a radially outer portion of the radially-extending cooling passages 130 to which the pressure side and/or suction side cooling passages 170, 172 fluidly couple. As shown, the plug 178 may direct coolant 180 flowing through the cooling passage 130 into the corresponding cooling passage 170, 172. In particular embodiments, the plug 178 may direct all of the coolant 180 flowing through the cooling passage 130 into the corresponding cooling passage 170, 172. The plug 178 may be a weld or other suitable structure that occludes the radially outer portion of the corresponding cooling passages 130.

Figure 6:
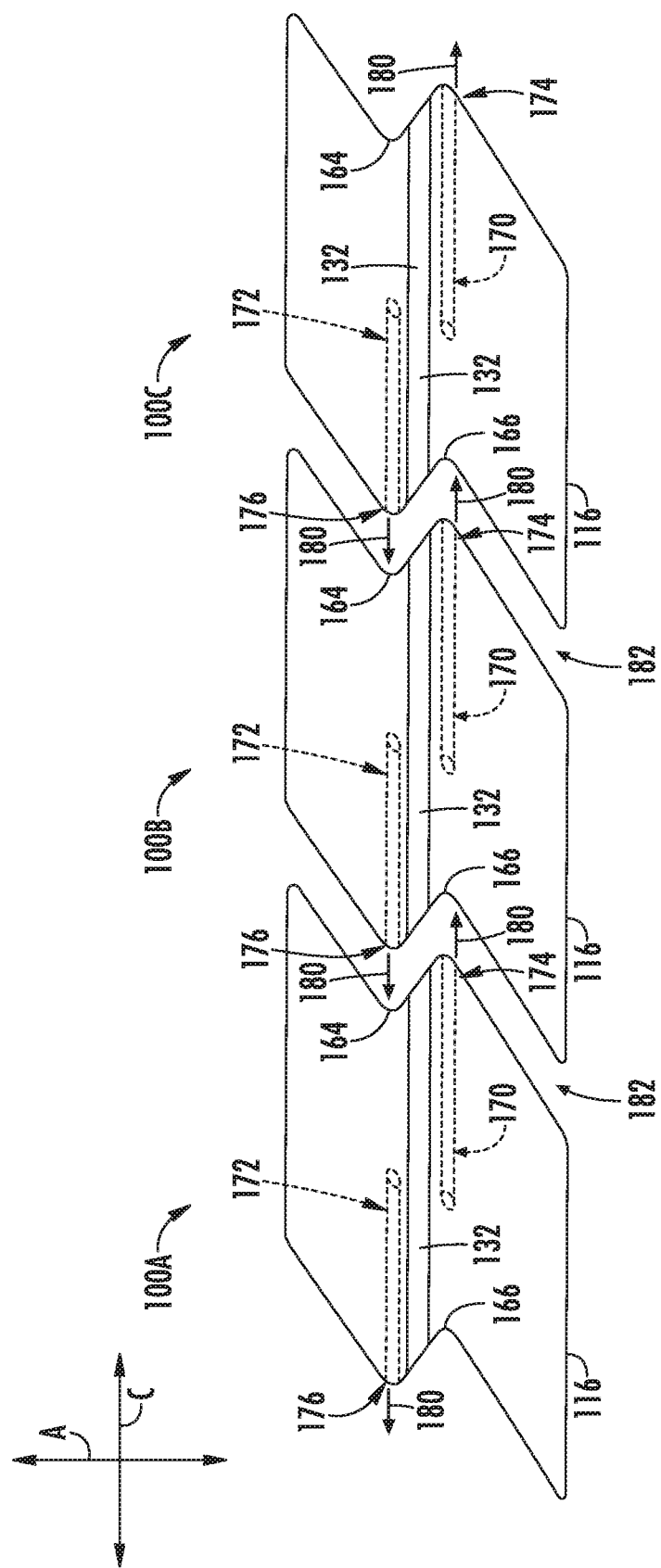
FIG. 6 is a top view of a plurality of adjacent rotor blades in accordance with the embodiments disclosed herein.

FIG. 6 illustrates a plurality of adjacent rotor blades 100. As shown, first, second, and third rotor blades 100A, 100B, 100C are axially aligned and circumferentially spaced apart. In this respect, the pressure side outlet 174 of the first rotor blade 100A is axially aligned with the suction side concave fillet 166 of the second rotor blade 100B. Similarly, the pressure side outlet 174 of the second rotor blade 100B is axially aligned with the suction side concave fillet 166 of the third rotor blade 100C. Furthermore, the suction side outlet 176 of the second rotor blade 100B is axially aligned with the pressure side concave fillet 164 of the first rotor blade 100A. Similarly, the suction side outlet 176 of the third rotor blade 100A is axially aligned with the pressure side concave fillet 164 of the second rotor blade 100B. In alternate embodiments, the outlets 174, 176 of the rotor blades 100A-C may be aligned with any suitable tip shroud fillets of the corresponding adjacent rotor blades.

During operation of the gas turbine engine 10, the coolant 180 flows through the pressure side and suction side cooling passages 170, 172 to respectively cool the pressure side concave fillet 166 and the suction side concave fillet 164 of the corresponding adjacent rotor blades 100A-C. More specifically, the coolant 180 (e.g., bleed air from the compressor section 14) enters the rotor blade 100 through the intake port 112 (FIG. 2). At least a portion of the coolant 180 flows through the cooling passages 130 in the airfoil 114 and into the pressure side and/or suction side cooling passages 170, 172. The coolant 180 exits the cooling passages 170, 172 respectively through the outlets 174, 176 and impinges on the adjacent concave fillets 164, 166, thereby cooling the concave fillets 164, 166. In particular, the coolant 180 exiting the outlet 174 of the first rotor blade 100A impinges on the concave fillet 166 of the second rotor blade 100B. Similarly, the coolant 180 exiting the outlet 174 of the second rotor blade 100B impinges on the concave fillet 166 of the third rotor blade 100C. Furthermore, the coolant 180 exiting the outlet 176 of the second rotor blade impinges on the concave fillet 164 of the first rotor blade 100A. Similarly, the coolant 180 exiting the outlet 176 of the third rotor blade 100A impinges on the concave fillet 164 of the second rotor blade 100B. In this respect, the outlets 174, 176 expel the coolant at a sufficient velocity to traverse the gaps 182 between the outlets 174, 176 and the corresponding concave fillets 164, 166 to facilitate such impingement cooling.

As described in greater detail, above the rotor blade 100 includes a tip shroud 116 that defines a pressure side and/or suction side cooling passage 170, 172, which direct the coolant 180 onto the fillets 164, 166 of adjacent rotor blades. In this respect, the rotor blade 100 provides greater cooling to the fillets 164, 166 of the tip shroud 116 than conventional rotor blades. As such, the rotor blade 100 may be able to withstand higher operating temperatures and/or have a longer service life than conventional rotor blades.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A rotor blade for a turbomachine, the rotor blade comprising:
   an airfoil;
   a tip shroud coupled to the airfoil, the tip shroud including a side surface, the side surface defining the outermost boundary of the tip shroud in an axial direction and a circumferential direction, the airfoil and the tip shroud defining a first cooling passage extending from an upstream end to a downstream end, the tip shroud further defining a second cooling passage intersecting and directly fluidly connected to the first cooling passage, the second cooling passage extending from an inlet at the downstream end of the first cooling passage to a first outlet defined on the side surface, the first outlet being configured to direct a coolant onto a tip shroud fillet of a first adjacent rotor blade, wherein the inlet defines a first diameter and the first outlet defines a second diameter, wherein the first diameter is equal to the second diameter, and wherein the first outlet is configured to expel the coolant at a sufficient velocity to traverse a gap between the first outlet and the tip shroud fillet such that the coolant impinges on the tip shroud fillet of the first adjacent rotor blade; and
   a plug positioned in a radially outer end of the first cooling passage to direct the coolant flowing through the first cooling passage into the second cooling passage, the plug being positioned entirely radially outward from the second cooling passage.

2. The rotor blade of claim 1, wherein the tip shroud entirely defines the second cooling passage.

3. The rotor blade of claim 1, wherein the tip shroud comprises a seal rail extending outward from a radially outer surface of the tip shroud, the second cooling passage disposed radially inward from both the radially outer surface of the tip shroud and the seal rail, and wherein the second cooling passage extends parallel to the seal rail.

4. The rotor blade of claim 1, wherein the airfoil and the tip shroud further define a third cooling passage, the tip shroud further defining a fourth cooling passage in fluid communication with the third cooling passage, the fourth cooling passage extending from the third cooling passage to a second outlet defined by the side surface, the second outlet being configured to direct the coolant onto a tip shroud fillet of a second adjacent rotor blade.

5. The rotor blade of claim 4, wherein the first outlet is positioned on a pressure side of the tip shroud and the second outlet is positioned on a suction side of the tip shroud.

6. The rotor blade of claim 4, wherein the tip shroud comprises a seal rail extending outward from a radially outer surface of the tip shroud, the second cooling passage being positioned forward of the seal rail and the fourth cooling passage being positioned aft of the seal rail.

7. The rotor blade of claim 4, wherein the second cooling passage and the fourth cooling passage are substantially parallel.

8. A turbomachine, comprising:
   a turbine section including a plurality of rotor blades, a first rotor blade of the plurality of rotor blades comprising:
   an airfoil;
   a tip shroud coupled to the airfoil, the tip shroud including a side surface, the side surface defining the outermost boundary of the tip shroud in an axial direction and a circumferential direction, the airfoil and the tip shroud defining a first cooling passage extending from an upstream end to a downstream end, the tip shroud further defining a second cooling passage extending from an inlet at the first cooling passage to a first outlet defined on the side surface, wherein the downstream end of the first cooling passage intersects and is directly fluidly connected to the inlet of the second cooling passage, the first outlet being configured to direct a coolant onto a tip shroud fillet of a second rotor blade of the plurality of rotor blades, wherein the inlet defines a first diameter and the first outlet defines a second diameter, wherein the first diameter is equal to the second diameter, and wherein the first outlet is configured to expel the coolant at a sufficient velocity to traverse a gap between the first outlet and the concave tip shroud fillet such that the coolant impinges on the tip shroud fillet of the first adjacent rotor blade; and
   a plug positioned in a radially outer end of the first cooling passage to direct the coolant flowing through the first cooling passage into the second cooling passage, the plug being positioned entirely radially outward from the second cooling passage.

9. The turbomachine of claim 8, wherein the tip shroud entirely defines the second cooling passage.

10. The turbomachine of claim 8, wherein the tip shroud comprises a seal rail extending outward from a radially outer surface of the tip shroud, the second cooling passage extending along the seal rail.

11. The turbomachine of claim 8, wherein the plug directs all of the coolant flowing through the first cooling passage into the second cooling passage.

12. The turbomachine of claim 8, wherein the airfoil and the tip shroud further define a third cooling passage, the tip shroud further defining a fourth cooling passage in fluid communication with the third cooling passage, the fourth cooling passage extending from the third cooling passage to a second outlet defined by the side surface, the second outlet being configured to direct the coolant onto a tip shroud fillet of a third rotor blade of the plurality of rotor blades.

13. The turbomachine of claim 12, wherein the first outlet is positioned on a pressure-side of the tip shroud and the second outlet is positioned on a suction-side of the tip shroud.

14. The turbomachine of claim 12, wherein the tip shroud comprises a seal rail extending outward from a radially outer surface of the tip shroud, the second cooling passage being positioned forward of the seal rail and the fourth cooling passage being positioned aft of the seal rail.

15. The turbomachine of claim 12, wherein the second cooling passage and the fourth cooling passage are substantially parallel.

16. A turbomachine, comprising:
a turbine section including a plurality of rotor blades, a first rotor blade of the plurality of rotor blades comprising:
an airfoil;
a tip shroud coupled to the airfoil, the tip shroud including a side surface having a convex tip shroud fillet, the side surface defining the outermost boundary of the tip shroud in an axial direction and a circumferential direction, the airfoil and the tip shroud defining a first cooling passage extending from an upstream end to a downstream end, the tip shroud further defining a second cooling passage intersecting and directly fluidly connected to the first cooling passage, the second cooling passage extending from an inlet at the downstream end of the first cooling passage to an outlet defined entirely on the side surface and disposed on the convex fillet, the outlet being configured to direct a coolant onto a concave tip shroud fillet of an adjacent second rotor blade, wherein the inlet defines a first diameter and the outlet defines a second diameter, wherein the first diameter is equal to the second diameter, and wherein the outlet is configured to expel the coolant at a sufficient velocity to traverse a gap between the outlet and the concave tip shroud fillet such that the coolant impinges on the concave tip shroud fillet of the adjacent second rotor blade; and
a plug positioned in a radially outer end of the first cooling passage to direct the coolant flowing through the first cooling passage into the second cooling passage, the plug being positioned entirely radially outward from the second cooling passage.

17. The turbomachine of claim 16, wherein the tip shroud of the rotor blade and the first adjacent tip shroud of the first adjacent rotor blade do not contact one another.

* * * * *